Oct. 18, 1955     S. A. PEERLESS     2,720,725

MINIATURE GREENHOUSE

Filed Sept. 5, 1952

INVENTOR.
Sidney A. Peerless.
BY
Wood, Herron & Evans
ATTORNEYS.

United States Patent Office 2,720,725
Patented Oct. 18, 1955

2,720,725

MINIATURE GREENHOUSE

Sidney A. Peerless, Cincinnati, Ohio

Application September 5, 1952, Serial No. 307,961

3 Claims. (Cl. 47—14)

This invention relates generally to horticulture, and is directed particularly to the rapid germination and growth of plants.

A primary object has been to provide a miniature greenhouse, in the form of a packaged unit which may be conditioned in a simple manner to germinate seeds and grow plants indoors. The unit is relatively small in its preferred form and is intended for the entertainment of shut-ins, particularly children who are confined to their beds at home or in hospitals.

Described generally, the greenhouse consists of a relatively small container or receptacle which is fabricated from a transparent material such as clear plastic. A dry, chemically inert, granulated material is packed within the receptacle and provides the supporting medium for the roots of the growing plants. Preferably but not necessarily, ordinary garden loam is mixed with the inert supporting material to provide a natural environment containing organic materials to aid the development of the growing plants.

The plants are nourished principally by a nutrient chemical mixture which is preferably mixed in dry powdered form with the dry supporting material and loam. By planting seeds in the dry mixture and adding water, an ideal growing medium is provided which enables the seeds to germinate and grow within a period of twenty-four to forty-eight hours. In order to speed up the process, the seeds may be soaked in warm water for a few hours before planting.

In order to provide the favorable growing temperature of a green house, a transparent lid or closure is provided for the receptacle. The lid is arranged to occupy two positions. In one position it provides a seal for the contents of the receptacle to facilitate shipment and handling with the granulated and pulverized materials confined within the self-contained unit. In a second or inverted position, as explained later in detail, the lid provides an adequate growing space for the plants after the seeds germinate.

A further object has been to provide a container which includes openings above the level of the supporting material to ventilate the growing space beneath the lid in an automatic manner when the lid is removed from shipping position and placed in the growing position.

A still further object has been to provide a receptacle which is arranged to provide, in an automatic manner, the drainage of excess water and to retain a reserve supply which saturates the granulated and pulverized materials for a prolonged period of time after the container is watered.

The miniature green house in its preferred form consists of a cylindrical container adapted to be placed indoors upon the window sill in the sun light. The vent holes are located near the upper edge of the container and in packaged or shipping condition, a flanged lid fits within the upper portion of the container. The lid by virtue of its flange, occupies a plane below the top edge of the container, with its flange sealing off the vent holes. When it is placed in inverted position, the vent holes are exposed and the flange of the lid rests upon the top of the container with the lid proper elevated above the top of the container to provide adequate growing space.

In another form of the invention, the lid is generally dome-shaped and need not be inverted when the unit is placed in use. In this case, the vent holes are sealed off by means of filter paper or similar material which may be punched out readily when the unit is placed in use.

In both forms of the invention, the container and lid are formed of transparent material in order to provide the green house effect and to allow the growth of the plants to be observed. Children especially derive a sense of accomplishment and pleasure in planting the seeds and watching the development of the plants. However, it will be understood that the unit is well adapted to be used for germinating indoor or outdoor plants, bulbs, roots and cuttings for commercial use.

In the form of the invention described above, the nutrient chemicals are mixed in dry form, directly with the granulated material in the container. In the alternative, these chemicals are furnished in a separate package either in dry form or as a liquid nutrient to be mixed with water and applied periodically to the seed bed.

Further advantages of the invention will be recognized from the following detailed description in conjunction with the drawings.

Figure 1:
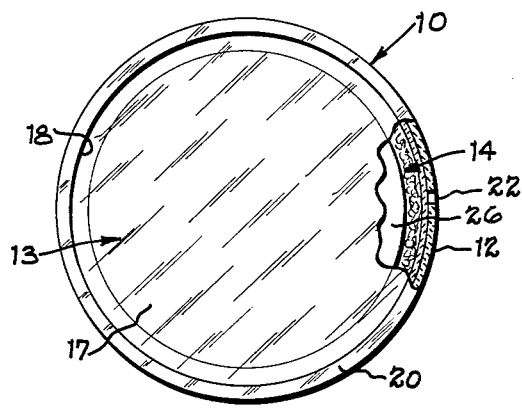
Figure 1 is a top plan view of the transparent receptacle which provides a miniature green house and also serves as a container for the components of the unit before the unit is placed in use.
Figure 2:
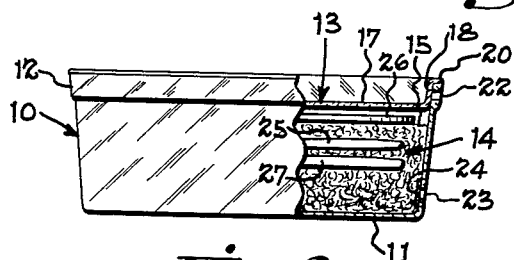
Figure 2 is a side elevation, partially in section, showing the receptacle and its contents before being placed in use, with the top cover sealed to confine the contents.
Figure 3:
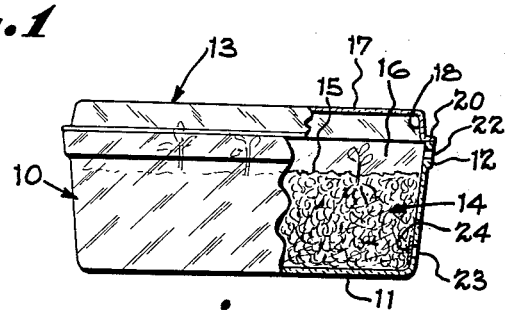
Figure 3 is a side elevation similar to Figure 2, showing the toy in use with the top cover in inverted position upon the top of the receptacle to form the miniature green house.

Referring to the embodiment of the invention shown in Figures 1 to 3, the receptacle 10 is generally cylindrical and includes a bottom 11 and a stiffening band 12 extending around its open end. The receptacle is preferably formed from a transparent plastic material which may be selected from any of the well known commercial grades.

Thermo-plastic is preferred because the receptacles can be produced with this material at low cost by the injection molding process. Moreover this class of plastic is strong but not brittle and provides sufficient rigidity even though the walls of the receptacle are relatively thin. It will be understood however, that although plastic material has been found most practical, other materials are useable.

As shown in Figure 2, the self-contained unit, is furnished with a cover or lid, indicated generally at 13, which fits snugly into the open top of the receptacle to confine without loss the granulated and pulverized materials within the receptacle when it is not in use. These materials are indicated generally at 14 in Figures 2 to 4. The cover 13 also is formed of a transparent plastic material, preferably of the same type as the receptacle, as explained above.

It will be noted in Figures 2 and 3, that the mixture of granulated and pulverized material 14 fills the receptacle to a level, indicated at 15, which is well below the top edge of the stiffening band 12. It will also be noted that the plane of lid 13, when in sealing position before the unit is placed in use (Figure 2), is depressed with respect to the top edge of the band 12, bringing the lid down substantially to the top level 15 of the material within the receptacle.

When the unit is conditioned for use, as explained below, the lid is removed and placed in an inverted position upon the top of the receptacle as shown in Figure 3. In this position, the depression or depth of the lid, which is now reversed, provides the growing space above the level 15 of the material as indicated at 16 in Figure 3.

In other words, the lid almost contacts the top surface of the material before the unit is placed in use and thus forms an effective closure for shipment and handling. On the other hand, upon being inverted, the lid forms the roof of the miniature green house and provides ample growing space.

In order to bring the lid downwardly to a plane below the top edge of the receptacle, the lid consists of a horizontal top panel 17 having a vertical rim 18 extending around its circumference (Figures 2 and 3). The free edge of the rim includes a horizontal flange 20 which projects in a radial direction outwardly from the rim. Flange 20 serves two purposes: First it limits the plane or position of the lid downwardly with respect to the top level of the material 14 as shown in Figure 2. Secondly it provides a seat engaging the top edge of the receptacle to space the top panel 17 upwardly and thus provide the growing space 16.

As shown, the receptacle and the rim of the lid preferably are tapered slightly in the outward direction from bottom to top. This provides a friction fit of the lid within the stiffening band 12 and allows the lid to be pressed securely in place when the unit is assembled. When the unit or toy is used, the lid 13 conveniently pried off, the seeds are planted, water is added and the lid is replaced in inverted position as explained above.

The granulated and pulverized material, which is generally indicated at 14, preferably contains both the nutrient chemical substances for the growing plants and also the mechanical support for the roots of the plant. The supporting medium preferably consists of a commercial product bearing the trade name of "vermiculite." This material consists of granulated mica in the form of a rather soft, yieldable mass composed of small pellets, each consisting of a pile of extremely thin plates of mica, closely spaced from one another. Each individual pellet is approximately $1/16''$ in size, and because of the close spacing of the individual plates of each pellet and the heterogeneous arrangement, the mass is capable in bulk, of absorbing a great deal of moisture.

It will be understood that the vermiculite is chemically inert and that its primary purpose is to provide a soft pervious material which the plant roots can penetrate readily and which therefore promotes growth and development. While vermiculite is preferred and presently used, it will be obvious that other chemically inert substances, having the same general characteristics can be used in its place.

It has been found in practice, that best results are obtained with a mixture of vermiculite and ordinary garden loam. The loam contains certain organic elements which are found to promote the development and growth of the seedlings after they germinate. In other words, the loam supplements the chemicals which are included in the nutrient mixture. Tests indicate that a mixture of one part vermiculite and one part loam provides the desired results when combined with the proper nutrient chemicals or fertilizer.

The nutrient or fertilizing chemicals which are combined with the mixture of vermiculite and loam, are well known and recognized in the so-called soilless culture of plants. By way of example but not of limitation, the preferred chemical nutrient mixture may consist of nitrate of potash, sulphate of ammonia, triple superphosphates, and vitamin $B_{12}$. To this may be added a sufficient quantity of formaldehyde to prevent certain fungus growths which are found to inhibit or prevent germination of the seeds.

This mixture of chemicals, which is soluble in water, is preferably commingled in dry pulverized form with the dry mixture of vermiculite and loam, then packed in the receptacle and sealed in as explained above. This dry mixture is capable, upon the introduction of seeds and water, of germinating the seeds and of nourishing the seedlings to produce healthy growing plants.

The purpose of the transparent receptacle and lid is to afford a full view of the development of the seedlings and plants and to produce the proper green house temperature to stimulate by sunlight the growth of the sprouting plants. It has been found in practice that the seeds germinate and small plants appear within twenty-four to forty-eight hours after having been planted and watered.

When the lid is placed in the inverted position shown in Figure 3, a growing space of approximately one inch is provided. When the growing plants have filled this space, they develop leaves and thereafter thrive best at room temperature. At this point therefore, the lid is removed and the plant is allowed to continue its growth process in the open air. If desired, the plants may be transplanted into flower pots or into the garden at this point.

As explained above, the miniature green house is intended primarily for the entertainment of children and adults. However, it will be obvious that it has a great deal of utility in starting plants indoors to be transplanted later for home or garden use. In this respect, the use of the vermiculite is of particular advantage because it is loose and allows the plants to be extracted individually without injury to their roots.

In order to provide ventilation, the receptacle 10 preferably is provided with vent holes 22 passing through the rim 12. These holes, as shown in Figure 2, are closed off by the rim 18 when the unit is not in use. When the lid 13 is inverted as shown in Figure 3, these holes which are diametrically opposed provide ventilation across the top of the growing space.

Drainage holes 23 are also provided above the bottom panel 11 of the receptacle as shown in Figures 2 and 3. These holes are spaced approximately $1/8$ inch above the bottom panel to allow the drainage of excess water. In order to prevent the granulated and pulverized materials from spilling from the drainage holes 23, pieces of filter paper 24 are applied over them. This material prevents passage of solid materials, but allows the drainage of excess water. Since the drainage holes 23 are spaced above the bottom panel, a reserve pool of water is retained, which by capillary action, keeps the granulated mixture in moist condition for a prolonged period after having been watered.

It will be noted in Figure 2, that a package of seeds 25 is packed with the unit so that it is complete and ready for use as sold. A printed paper disk 26 is also placed on the granulated material immediately below the lid. The disk identifies the product, being visible through the transparent lid, and is removed before the unit is placed in use.

The unit above described is most convenient because it is placed in condition to grow plants simply by planting the seeds and adding water. The proper amount of water is governed automatically by the drainage holes which decant the excess and provide a reservoir.

It is also contemplated, as explained earlier, to provide a supply of nutrient chemicals which may be dissolved in water to be applied periodically to the green house. In this event, the chemical mixture is omitted from the vermiculite and loam mixture and instead is packed with the unit in an envelope or bottle as indicated at 27 in Figure 2.

Figure 4:
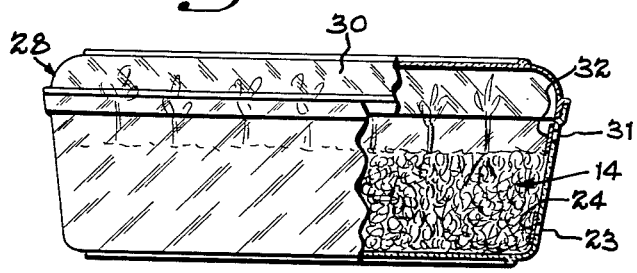
Figure 4 is a side elevation of a modified version of the unit in which the receptacle is of rectangular form to accommodate a greater number of plants and is provided with an elevated top cover which occupies the same position before and after the toy is placed in use.
Figure 5:
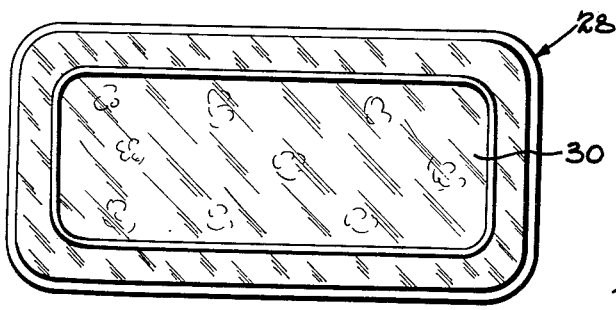
Figure 5 is a top plan view projected from Figure 4, further illustrating the rectangular receptacle.

The modified receptacle shown in Figures 4 and 5 is of the same general nature of the one described above, and differs principally with respect to its shape and the arrangement of the lid. As shown, the receptacle 28 is rectangular instead of cylindrical, and has a larger capacity than the cylindrical receptacle. The cover or lid 30 differs from the one described above in that it is generally dome-shaped and occupies an elevated position with respect to the level of the mixture of vermiculite and loam. Therefore it is not inverted when placed in use; instead it is taken off to plant the seeds and apply water, then replaced in its original position as shown in Figure 4. This receptacle is furnished as shown, with a mixture of granulated materials 14 and a seed package as explained above. Pulverized nutrient chemicals may be mixed with the material 14 or the chemicals may be furnished separately to be mixed with water if desired.

The rectangular green house 28 is also provided with drainage and ventilation holes. Since the lid 30 is not inverted, the vent holes 31 are located below the lower edge of the lid and are closed off with filter paper as indicated at 32. These may be pierced conveniently with a pencil or other pointed instrument when the green house is conditioned for use. Drainage holes, similar to those described above, are located slightly above the bottom of the container as indicated at 23.

Having described my invention, I claim:

1. A self-contained convertible shipping package and miniature greenhouse for germinating seeds and developing plants upon adding water thereto comprising, a cylindrical container having a bottom and a peripheral wall rising upwardly from the bottom to a height less than the diameter of the container and having an open top, a combined shipping lid and greenhouse roof formed of transparent material, said lid being generally cylindrical and having a roof panel and a peripheral wall extending outwardly to an open end, the lid wall extending outwardly less than half the height of the container wall, the open end of the lid having an outside diameter equal to the inside diameter of the open top portion of the container, the open end of the lid wall having a rim extending horizontally from the periphery thereof, the lid fitted into the open top of the container and providing a shipping package, said rim engaging the open top of the container and the lid side wall spacing the roof panel in a plane depressed below the open top of the container, the wall of the lid and container being correspondingly tapered upwardly and outwardly and snugly interfitted, a mass of dry granulated nutrient material in the container to nourish the developing plants, said material packed within the container substantially to the plane of the roof panel of the lid, thereby to confine the granulated material in the package, the wall of the container including a plurality of vent openings in the upper portion thereof, said openings residing in a plane spaced below the open top of the container a distance less than the extent of the lid wall and thereby sealed by the lid wall, said lid converting said shipping package into a greenhouse upon reversal of position with the flat lid rim seated upon the open top of the container, the lid wall spacing the roof panel above the top plane of the granulated material a distance substantially twice the extent of the lid wall and providing growing space for the developing plants, the vent openings of the container being opened upon reversal of the lid to provide ventilation across said growing space.

2. A convertible self-contained shipping package and miniature greenhouse for germinating seeds and developing plants comprising, a cylindrical container having a bottom and a peripheral wall rising upwardly to a height less than the diameter of the container and having an open top, a combined shipping lid and greenhouse roof formed of transparent material, said lid being generally cylindrical and having a roof panel and a peripheral wall extending outwardly to an open end, the lid wall extending outwardly less than half the height of the container wall and having an outside diameter equal to the inside diameter of the container, the open end of the lid wall having a flat rim extending horizontally from the periphery thereof, the lid fitted into the open top of the container and providing a shipping package, said rim engaging the open top of the container and the lid side wall spacing the roof panel in a depressed plane below the open top of the container, a mass of granulated nutrient material in the container to nourish the developing plants, said material packed within the container substantially to the plane of the roof panel of the lid, thereby to confine the granulated material in the package, the wall of the container including a plurality of vent openings in the upper portion thereof, said vent openings residing in a plane spaced below the open top of the container a distance less than the extent of the lid wall and thereby sealed by the lid wall, said lid converting the said shipping package into a greenhouse upon reversal of position with the flat lid rim seated upon the open top of the container, the lid wall spacing the roof panel above the top plane of the granulated material a distance substantially twice the extent of the lid wall and providing growing space for the developing plants, the vent openings of the container being opened upon reversal of the lid to provide ventilation across said growing space, the container wall having drainage openings residing in a plane spaced above the bottom of the container a distance less than the extent of the lid wall, said openings delineating a water reservoir in the lower portion of the container to feed moisture by capillarity upwardly through the mass of granulated material.

3. A convertible self-contained shipping package and miniature greenhouse for germinating seeds and developing plants comprising, a cylindrical container having a bottom and a peripheral wall rising upwardly to a height less than the diameter of the container and having an open top, a combined shipping lid and greenhouse roof formed of transparent material, said lid being generally cylindrical and having a roof panel and a peripheral wall extending outwardly to an open end, the lid wall extending outwardly less than half the height of the container wall and having an outside diameter equal to the inside diameter of the container, the open end of the lid wall having a flat rim extending horizontally from the periphery thereof, the lid fitted into the open top of the container and providing a shipping package, said rim engaging the open top of the container and the lid side wall spacing the roof panel in a depressed plane below the open top of the container, a mass of granulated nutrient material in the container to nourish the developing plants, said material packed within the container substantially to the plane of the roof panel of the lid, thereby to confine the granulated material in the package, the wall of the container including a plurality of vent openings in the upper portion thereof, said vent openings residing in a plane spaced below the open top of the container a distance less than the extent of the lid wall and thereby sealed by the lid wall, said lid converting the said shipping package into a greenhouse upon reversal of position with the flat lid rim seated upon the open top of the container, the lid wall spacing the roof panel above the top plane of the granulated material a distance substantially twice the extent of the lid wall and providing growing space for the developing plants, the vent openings of the container being opened upon reversal of the lid to provide ventilation across said growing space, the container wall having drainage openings residing in a plane spaced above the bottom of the container a distance less than the extent of the lid wall, said openings delineating a water reservoir in the lower portion of the container to feed moisture by capillarity upwardly through the mass of granulated material, and respective filter elements extending across the drainage openings, said filter elements impeding the passage of solid materials and providing passage of water, thereby to confine the granulated material in the shipping package and draining off excess water when the same is converted into a greenhouse.

References Cited in the file of this patent

UNITED STATES PATENTS

| | | |
|---|---|---|
| 1,300,245 | Bussey | Apr. 15, 1919 |
| 1,778,150 | Freeburg | Oct. 14, 1930 |
| 1,815,195 | Favata | July 21, 1931 |
| 1,848,219 | Kerr | Mar. 8, 1932 |
| 1,959,510 | Van Waveren | May 22, 1934 |
| 2,039,442 | Mulford | May 5, 1936 |
| 2,238,781 | Ritter | Apr. 15, 1941 |
| 2,361,029 | Heinl | Oct. 24, 1944 |
| 2,401,038 | Barton et al. | May 28, 1946 |

FOREIGN PATENTS

| | | |
|---|---|---|
| 924,467 | France | Mar. 10, 1947 |